(12) United States Patent
Nishida et al.

(10) Patent No.: US 10,458,512 B2
(45) Date of Patent: Oct. 29, 2019

(54) TORSIONAL VIBRATION DAMPER

(71) Applicant: TOYOTA JIDOSHA KABUSHIKI KAISHA, Toyota-shi, Aichi-ken (JP)

(72) Inventors: Hideyuki Nishida, Shizuoka-ken (JP); Hiroyuki Amano, Susono (JP); Yuya Takahashi, Susono (JP); Shuhei Horita, Numazu (JP); Taiki Nakamura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/797,373

(22) Filed: Oct. 30, 2017

(65) Prior Publication Data

US 2018/0119773 A1 May 3, 2018

(30) Foreign Application Priority Data

Oct. 31, 2016 (JP) .................. 2016-213347

(51) Int. Cl.
*F16F 15/14* (2006.01)

(52) U.S. Cl.
CPC ........ *F16F 15/145* (2013.01); *F16F 2222/08* (2013.01); *F16F 2230/0052* (2013.01); *F16F 2230/0082* (2013.01)

(58) Field of Classification Search
CPC ...... F16F 15/14; F16F 15/145; F16F 15/1457; F16F 2222/08; F16F 2230/0052; F16F 2230/0082
See application file for complete search history.

(56) References Cited

U.S. PATENT DOCUMENTS

| 6,026,940 A | * | 2/2000 | Sudau | F16F 15/145 |
| | | | | 192/3.28 |
| 8,850,927 B2 | * | 10/2014 | Kinoshita | F16F 15/145 |
| | | | | 74/572.2 |
| 9,435,397 B2 | * | 9/2016 | Aijima | F16F 15/145 |
| 9,689,452 B2 | * | 6/2017 | Ray | F16F 7/10 |
| 9,803,718 B2 | * | 10/2017 | Miyahara | F16F 15/145 |
| 2012/0255394 A1 | * | 10/2012 | Maienschein | F16F 15/145 |
| | | | | 74/574.2 |

(Continued)

FOREIGN PATENT DOCUMENTS

| CN | 105697649 A | 6/2016 | | |
| DE | 102014216540 A1 | * | 3/2015 | ............ F16F 15/145 |

(Continued)

OTHER PUBLICATIONS

Machine translation of DE 102014118869 A1 obtained on Jun. 1, 2018. (Year: 2018).*

*Primary Examiner* — Adam D Rogers
(74) *Attorney, Agent, or Firm* — Hunton Andrews Kurth LLP

(57) ABSTRACT

A torsional vibration damper in which a mass may be fitted easily into a chamber is provided. In the rotary disc, an insertion hole is formed integrally with the chamber. An opening diameter of the insertion hole is larger than an outer diameter of a flange plate of the mass, and an opening width at a boundary between the insertion hole and the chamber is larger than an outer diameter of a trunk of the mass. The retainer comprises a restricting portion that restricts an oscillating range of the mass in the chamber.

6 Claims, 10 Drawing Sheets

(56) References Cited

U.S. PATENT DOCUMENTS

2017/0234401 A1 * 8/2017 Horita .................. F16F 15/145
74/572.21

FOREIGN PATENT DOCUMENTS

| | | | | |
|---|---|---|---|---|
| DE | 102014118869 A1 * | 7/2015 | ............ | F16F 15/145 |
| DE | 102014213906 A1 | 1/2016 | | |
| DE | 102015216742 A1 * | 3/2017 | ............ | F16F 15/145 |
| JP | 2014-219031 A | 11/2014 | | |
| JP | 2015132338 A | 7/2015 | | |
| JP | 2017002913 A * | 1/2017 | | |
| WO | WO-2015144158 A1 * | 10/2015 | ............ | F16F 15/145 |

* cited by examiner

TORSIONAL VIBRATION DAMPER

The present invention claims the benefit of Japanese Patent Applications No. 2016-213347 filed on Oct. 31, 2016 with the Japanese Patent Office, the disclosure of which is incorporated herein by reference in its entirety.

BACKGROUND

Field of the Invention

The present invention relates to the art of a torsional vibration damper that suppresses torsional vibrations by a pendulum motion of a inertia mass.

Discussion of the Related Art

JP-A-2014-219031 describes one example of a torsional vibration damper. In the damper taught by JP-A-2014-219031, a plurality of chambers are formed on a rotary disc, and a rolling mass is individually held in each of the chambers. The rolling mass comprises a trunk and a pair of flanges individually formed around each circumferential edge of the trunk. When the rotary disc is rotated, the rolling mass is centrifugally pushed onto a raceway surface of the chamber while being oscillated by torque pulses. According to the teachings of JP-A-2014-219031, the rotary disc is divided into a plurality of segments in such a manner that each of the chambers is radially split into two. In the damper taught by JP-A-2014-219031, therefore, the rolling mass is allowed to be held in the chamber by combining adjoining segments of the rotary disc.

In the damper taught by JP-A-2014-219031, specifically, the rolling mass is held in the chamber by fitting a groove formed around an outer circumference of the trunk of the rolling mass between the flanges with a split chamber of one of the segments of the rotary disc, and combining the segments from both sides of the rolling mass. However, number of parts is increased in the damper taught by JP-A-2014-219031, and man-hour has to be increased to assemble the damper. In addition, rigidity of the assembled damper and assembly accuracy of the damper may be reduced. For these reasons, the rolling mass may not be allowed to oscillate in the chamber along a designed orbit and hence vibrations resulting from torque pulses may not be suppressed sufficiently.

SUMMARY OF THE INVENTION

The present invention has been conceived noting the foregoing technical problems, and it is therefore an object of the present invention is to provide a torsional vibration damper in which a mass may be fitted into a chamber easily without increasing a manufacturing cost and without causing a reduction in an assembly accuracy.

The present invention relates to a torsional vibration damper comprising: a rotary disc in which a plurality of chambers individually having a predetermined length in a circumferential direction are formed circumferentially at regular intervals; a plurality of masses held in the chambers while being allowed to be oscillated by pulsation of torque applied to the rotary disc; and a retainer that retains the masses in the chambers while maintaining intervals between the masses, and that is allowed to be rotated relatively to the rotary disc by an oscillating motion of the mass. The mass comprises a trunk and a pair of diametrically-larger flange plates formed on both sides of the trunk, and a diameter of the trunk is smaller than an opening width of the chamber and a diameter of each of the flange plate is larger than the opening width of the chamber. In order to achieve the above-explained objective, according to the embodiments of the present disclosure, the chamber includes an insertion hole that is formed integrally to let through the flange plate of the mass. An opening width at a boundary between the insertion hole and the chamber is larger than the outer diameter of the trunk of the mass. In addition, the retainer comprises a restricting portion that restricts an oscillating range of the mass in the chamber toward the insertion hole.

In a non-limiting embodiment, an opening diameter of the insertion hole may be larger than the outer diameter of the flange plate of the mass.

In a non-limiting embodiment, the retainer may comprise a ring portion formed radially inner side of the chambers, and a plurality of holder portions individually formed of a pair of stopper portions protruding radially outwardly from the ring portion to hold the mass. A radially outer side of an inner circumferential face of the chamber may serve as a raceway surface to which the mass is pushed centrifugally, and the raceway surface may be curved inwardly so that a curvature radius of the raceway surface is shorter than that of a bottom between the stopper portions of the holder portion. The bottom may serve as the restricting portion that restricts that restricts the oscillating range of the mass in the chamber.

In a non-limiting embodiment, a pair of the chambers may be is joined to each other through the insertion hole.

In a non-limiting embodiment, a clearance between outer ends of the adjoining chambers may be wider than a clearance between the chambers joined to each other through the insertion hole.

In a non-limiting embodiment, the retainer may comprise a ring portion formed radially inner side of the chambers, and a plurality of holder portions individually formed of a pair of stopper portions protruding radially outwardly from the ring portion to hold the mass. In addition, at least one of the stopper portions may serve as the restricting portion to stop a movement of the other mass toward the insertion hole.

In a non-limiting embodiment, the torsional vibration damper may further comprise: a guide pin formed on at least one of the retainer and the rotary disc to extend in parallel with a rotational center axis of the rotary disc thereby connecting the ring portions of a pair of the retainers situated on both faces of the rotary disc; and a guide hole having an arcuate shape formed on the other one of the retainer and the rotary disc to guide the guide pin in a rotational direction of the rotary disc. The guide pin and the guide hole may be arranged in such a manner that any one of the stopper portions is stopped in the vicinity of the boundary between the insertion hole and the chamber when the guide pin comes into contact to one end of the guide hole.

In a non-limiting embodiment, the insertion hole may be formed in such a manner as to protrude radially inwardly from an intermediate portion of the chamber. In this case, the retainer may comprise a ring portion formed radially inner side of the chambers, a plurality of holder portions individually formed of a pair of stopper portions protruding radially outwardly from the ring portion to hold the mass, and a bottom formed between the stopper portions. In this case, the bottom may serve as the restricting portion to close an opening of the insertion hole thereby preventing the other mass from entering into the insertion hole.

In the torsional vibration damper according to the embodiments of the present disclosure, torsional vibrations resulting from pulsation of torque applied to the rotary disc is suppressed by an oscillating motion of the mass held in the chamber formed in the rotary disc. In order to prevent disengagement of the mass from the chamber, the flange plates are formed on both sides of the trunk of the mass. Each of the chambers are joined to the insertion hole that is diametrically larger than the mass so that the mass may be fitted easily into the chamber from insertion hole. When the mass 3 is oscillated in the chamber by the pulsation of torque applied to the rotary disc, an entrance of the mass 3 into the insertion hole is prevented by the restricting portion. That is, disengagement of the mass from the chamber is prevented by the restricting portion. When the rotary disc rotated slowly, the masses are gravitationally dropped in the chambers. In this situation, however, torques applied to the retainer from the masses situated in the right side and the masses situated in the left side cancel each other so that the retainer is prevented from being rotated unintentionally. For this reason, collision noise and impact resulting from collision of the mass against the outer end of the chamber may be reduced.

According to at least one embodiment of the present disclosure, when the mass moves to the vicinity of the outer end of the chamber, the flange plate is pushed radially outwardly by a bottom of the retainer so that the trunk of the mass is pushed onto the raceway surface of the chamber. Consequently, the mass is prevented from colliding with the outer end of the chamber to reduce the collision noise.

Since the insertion hole is formed integrally with the chamber(s), the rotary disc may be processed easily while ensuring rigidity.

As described, a pair of chambers may be joined to a common insertion hole, and the clearance between outer ends of the adjoining chambers is wider than the clearance between the chambers joined to each other through the insertion hole. In this case, a portion between the outer ends of the adjoining chamber may serves as a spoke to enhance rigidity of the rotary disc.

According to at least one embodiment, the stopper portion of the retainer may serve as the restricting portion to restrict a movement of the mass toward the insertion hole. For this reason, the raceway surface and the bottom of the holder portion of the retainer may be formed without requiring high working accuracy.

Since the pair of retainers is connected to each other through the guide pin inserted into the guide hole, the retainers is allowed to rotate smoothly with respect to the rotary disc, and disengagement of the mass held in the chamber may be prevented.

In addition, the spoke portions may be formed in the rotary disc irrespective of the configurations of the chambers and the insertion holes to ensure required rigidity of the rotary disc.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
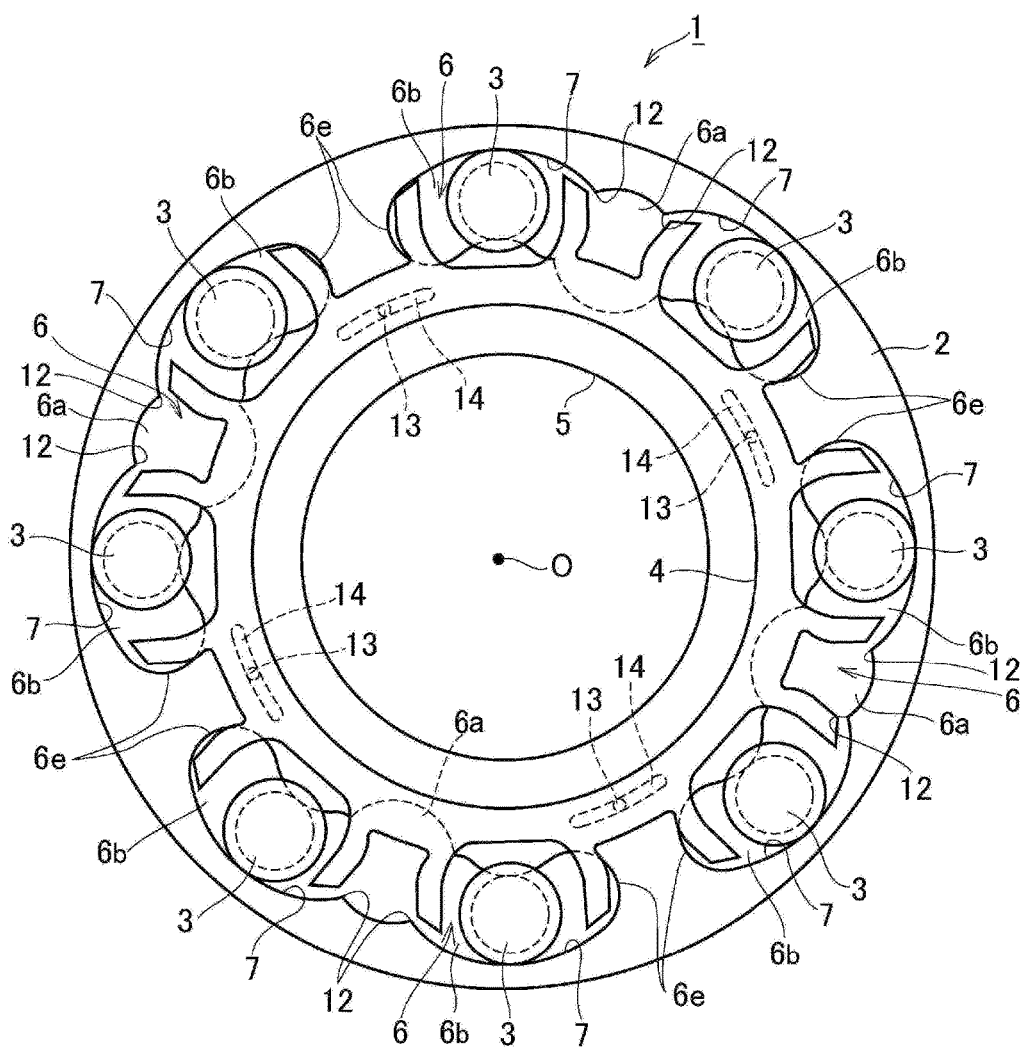
FIG. 1 is a front view showing the torsional vibration damper according to at least one embodiment of the present disclosure.

Preferred embodiments of the present application will now be explained with reference to the accompanying drawings. Turning now to FIG. 1, there is shown a preferred embodiment of the torsional vibration damper 1 for suppressing torsional vibrations in a vehicle resulting from pulsation of torque of an engine to a transmission by an oscillating motion of a mass. The torsional vibration damper comprises a rotary disc 2 that is rotated by the torque of the engine, a plurality of rolling mass 3 held in the rotary disc 2, and a ring-shaped retainer 4 having a plurality of holder portions 4d individually holding the rolling mass 3 therein.

Figure 2:
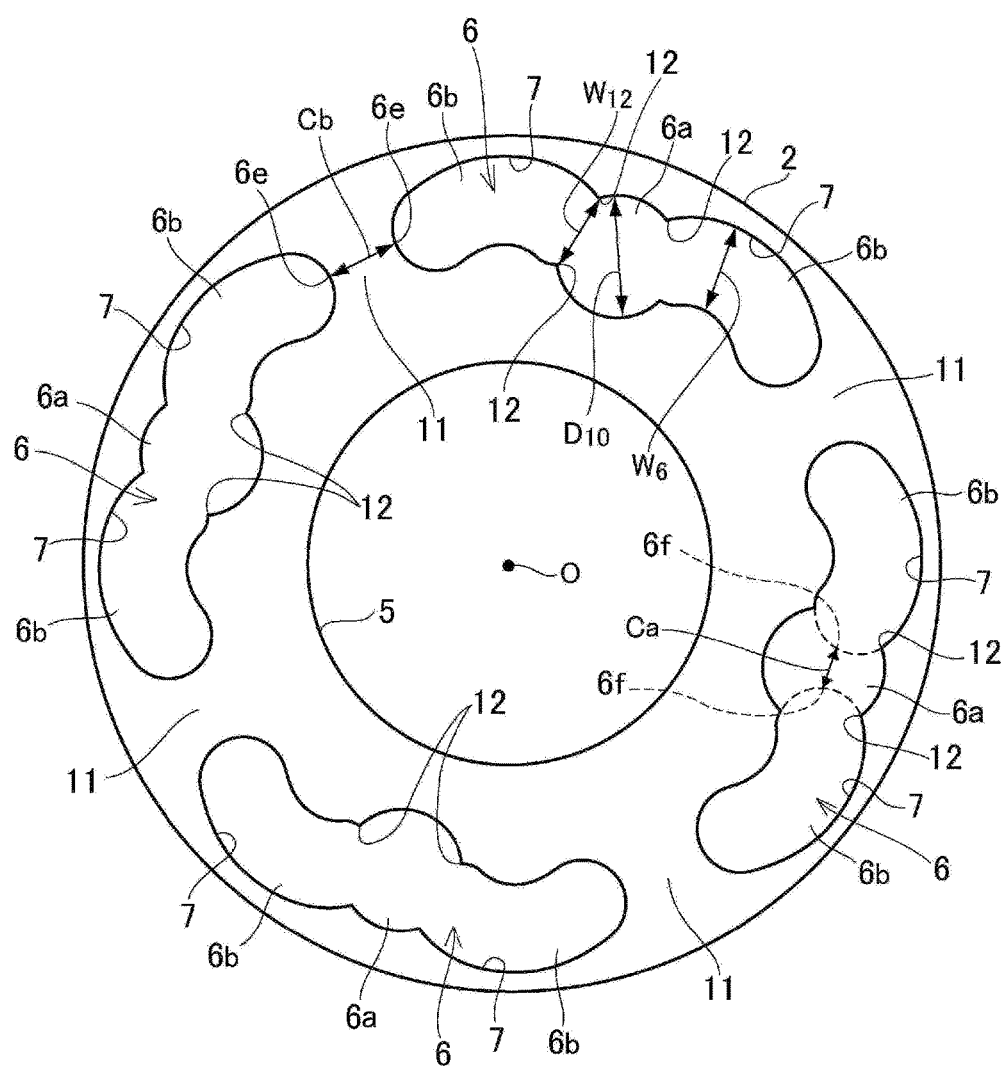
FIG. 2 is a front view showing the rotary plate.

A structure of the rotary disc 2 is shown in FIG. 2 in more detail. A through hole 5 to which a rotary shaft (not shown) is inserted is formed on a center of the rotary disc 2, and two pairs of bores 6 are formed on an outer circumferential portion of the rotary disc 2. Specifically, one pair of the bores 6 is situated radially opposed to each other across a center point O of the rotary disc 2, and another pair of the bores 6 is situated radially opposed to each other across the center point O. In other words, total four bores 6 are arranged circumferentially at regular intervals.

Each of the bores 6 comprises an insertion hole 6a formed in a shape of truncated circle, and a pair of kidney-shaped (or jellybean-shaped) chambers 6b joined to the insertion hole 6a from both sides in the circumferential direction. Specifically, each of the chambers 6b is curved inwardly so that a curvature radius of each of the chambers 6b is shorter than that of the rotary disc 2 with respect to the center point O. A radially outer side of an inner circumferential face of the chamber 6b serves as a raceway surface 7.

Figure 3A:
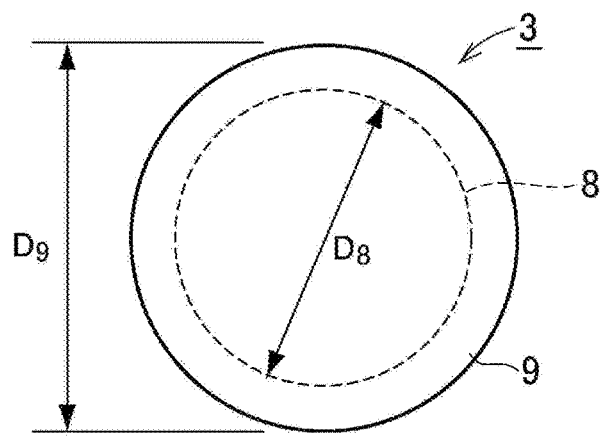
FIG. 3A is a front view of the rolling mass.
Figure 3B:
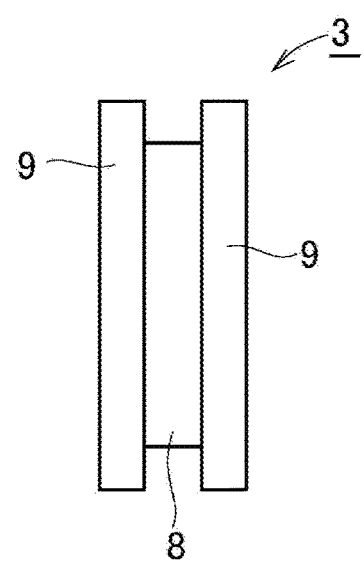
FIG. 3B is a side view of the rolling mass.

A structure of the mass 3 is shown in FIGS. 3A and 3B. The mass 3 is individually held in each of the chambers 6b in such a manner as to roll along the raceway surface 7 of the chamber 6b. Specifically, the mass 3 comprises a trunk 8 and a pair of diametrically-larger flange plates 9 formed on both sides of the trunk 8. A thickness of the trunk 8 is thicker than that of the rotary disc 2, and as shown in FIG. 3A, an outer diameter $D_9$ of each of the flange plate 9 is individually larger than an outer diameter $D_8$ of the trunk 8 (i.e., $D_8 < D_9$). That is, as illustrated in FIG. 3B, the mass 3 has an "H-shaped" cross-section.

Turning back to FIG. 2, in order to retain the mass 3 in the chamber 6b, the outer diameter $D_8$ of the trunk 8 is equal to or smaller than an opening width $W_6$ of the chamber 6b (in a radial direction of the rotary disc 2), but the outer diameters $D_9$ of the flange plates 9 are larger than the opening width $W_6$ of the chamber 6b (i.e., $D_8 \leq W_6 < D_9$).

As depicted by a dashed-curve in FIG. 2, a clearance Ca between the chambers 6b joined to each other through the insertion hole 6a (i.e., a virtual clearance between virtual inner ends 6f of the chambers 6b in the bore 6) is narrower than a clearance Cb between outer ends 6e of the chambers 6b of the adjoining bores 6 (i.e., Ca<Cb). That is, in the rotary disc 2, each portion between the outer ends 6e of the adjoining bores 6 individually serves as a spoke 11 connecting an inner circumferential portion and an outer circumferential portion of the rotary disc 2.

As described, the opening width $W_6$ of the chamber 6b is narrower than the outer diameters $D_9$ of the flange plates 9 to prevent detachment of the mass 3 from the chamber 6b. That is, the mass 3 may not be inserted into the chamber 6b directly, but the insertion hole 6a is designed to let the flange plate 9 of the mass 3 into the chamber 6b.

For example, the insertion hole 6a may be shaped not only into a circular shape but also into an oval shape and polygonal shape. In order to let the flange plate 9 of the mass 3 into the chamber 6b, an opening diameter $D_{10}$ of the insertion hole 6a may be set to be slightly larger than the outer diameter $D_9$ of the flange plate 9 of the mass 3. Alternatively, the opening diameter $D_{10}$ of the insertion hole 6a may also be set to be slightly smaller than the outer diameter $D_9$ of the flange plate 9. In this case, the mass 3 may be let into the insertion hole 6a while being inclined and utilizing a space connected to the virtual inner ends 6f of the chambers 6b.

As depicted in FIG. 2, the opening width $W_6$ of the chamber 6b is constant except for the rounded outer end 6e, and the insertion hole 6a is joined to a radially inner starting point and a radially outer starting point of the virtual inner ends 6f of the chamber 6b. That is, an opening width $W_{12}$ at a boundary 12 between the insertion hole 6a and the chamber 6b is identical to the opening width $W_6$ of the chamber 6b, and larger than the outer diameter $D_8$ of the trunk 8 but smaller than the outer diameter $D_9$ of the flange plate 9.

Figure 4:
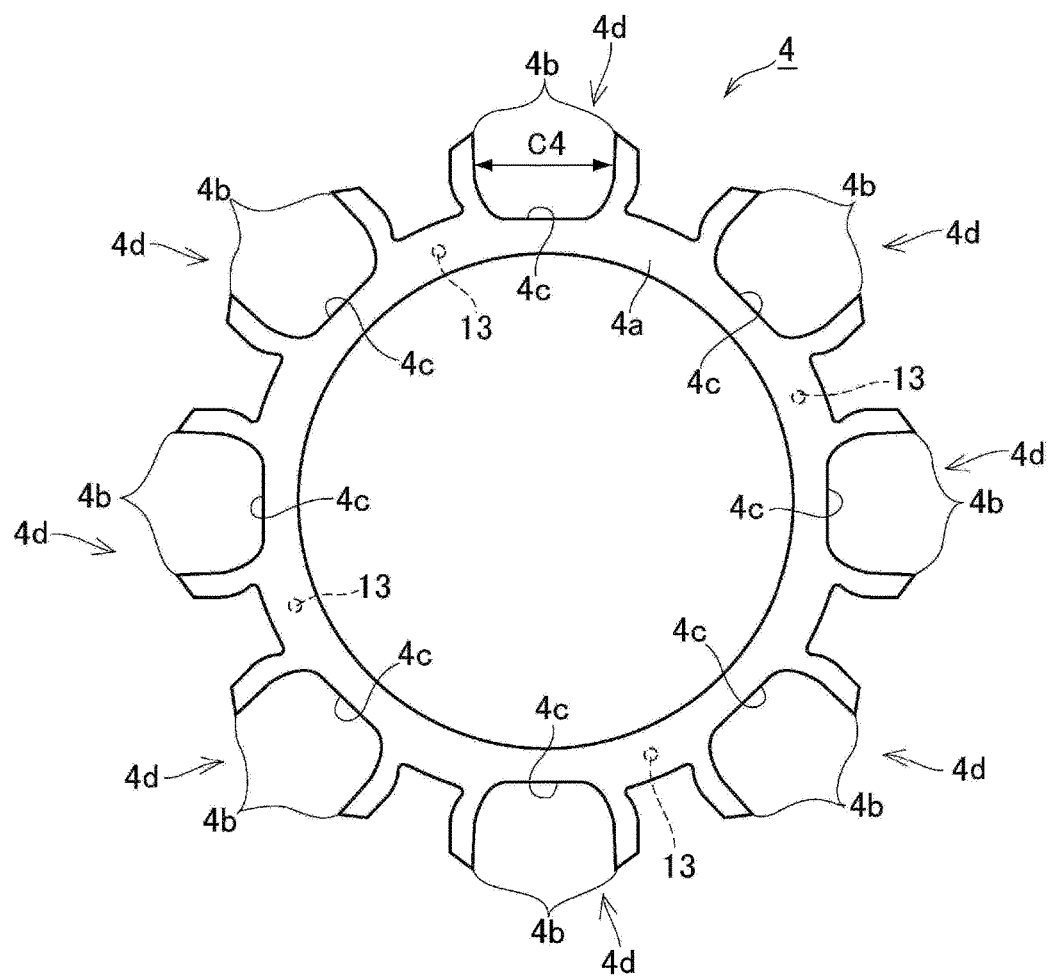
FIG. 4 is a front view of the retainer.

A structure of the retainer 4 is shown in FIG. 4 in more detail. In the torsional vibration damper 1, a pair of retainers 4 is arranged on both sides of the rotary disc 2. Each of the retainers 4 individually comprises a ring portion 4a and a plurality of holder portions 4d. Specifically, an inner diameter of the ring portion 4a is larger than an inner diameter of the through hole 5 of the rotary disc 2, and an outer diameter of the ring portion 4a is slightly smaller than a distance between radially innermost portions of the chamber 6b opposed to each other through the center point O. Each of the holder portions 4d comprises a pair of stopper portions 4b individually protruding radially outwardly from the ring portion 4a to the vicinity of the raceway surface 7 of the rotary disc 2 so as to restrict an oscillating range of the mass 3 from both sides. Specifically a clearance C4 between the pair of stopper portions 4b is wider than the outer diameter $D_9$ of the flange plate 9 so that the mass 3 is held loosely in the holder portions 4d. In addition, in order to prevent the mass 3 from colliding with the outer end 6e of the chamber 6b, the clearance C4 between the pair of stopper portions 4b forming the holder portion 4d is narrower than a circumferential length (or width) of the chamber 6b.

As the bores 6 of the rotary disc 2, a clearance between the adjoining stopper portions 4b of the adjoining holder portions 4d is narrower than the clearance C4 between the pair of stopper portions 4b forming the holder portion 4d. Each of the retainers 4 is allowed to rotate within a predetermined range with respect to the rotary disc 2. As described later, when the mass 3 migrates to the vicinity of the outer end 6e of the bore 6, the flange plate 9 is pushed radially outwardly by a bottom 4c of the holder portion 4d so that the trunk 8 of the mass 3 is pushed onto the raceway surface 7 of the chamber 6b.

In order to allow the pair of retainers 4 to rotate integrally around the center point O of the rotary disc 2, according to the first embodiment, a plurality of guide holes 14 are formed on both faces of the rotary disc 2 at a level corresponding to the ring portion 4a of the retainer 4, and inner faces of the retainers 4 are connected through a plurality of guide pins 13 individually penetrating through each of the guide hole 14. Each of the guide holes 14 has a predetermined length in the circumferential direction, and each of the guide holes 14 is individually formed into an oval holes slightly curved along an orbit of the guide pins 13. In other words, each of the guide holes 14 is individually shaped into an arcuate shape. On the other hand, each of the guide pins 13 extends in parallel with a rotational center axis of the rotary disc 2, and a diameter of each of the guide pins 13 is substantially equal to or slightly smaller than an opening width of the guide hole 14. In the torsional vibration damper 1, therefore, the pair of retainers 4 is allowed to rotate integrally around the center point O of the rotary disc 2 and relatively to the rotary disc 2 within the circumferential length of the guide hole 14. Since the retainers 4 are not subjected to a load holding the masses 3, the retainers 4 are allowed to rotate smoothly. Alternatively, the guide pins 13 may also be formed on both faces of the rotary disc 2 in such a manner as to protrude toward retainers 4, and the guide holes 14 may also be formed on the inner face of each of the retainer 4.

Here will be explained a procedure to fit the mass 3 into the chamber 6b of the bore 6. As described, the outer diameter $D_9$ of the flange plate 9 of the mass 3 is larger than the opening width $W_6$ of the chamber 6b, and hence the mass 3 is inserted into the chamber 6b from the insertion hole 6a of the bore 6. Specifically, one of the flange plates 9 of the mass 3 is passed through the insertion hole 6a of the bore 6 to align the trunk 8 with the rotary disc 2 in the insertion hole 6a. As also described, the opening width $W_{12}$ at the boundary 12 between the insertion hole 6a and the chamber 6b is larger than the outer diameter $D_8$ of the trunk 8 so that the mass 3 is allowed to slide into the chamber 6b. In the bore 6, the mass 3 is fit into both of the chambers 6 by the above-explained procedures. Since the outer diameter $D_9$ of the flange plate 9 of the mass 3 is larger than the opening width $W_6$ of the chamber 6b, detachment of the mass 3 from the chamber 6b may be prevented.

Then, the pair of retainers 4 is placed on both faces of the rotary disc 2 in such a manner as to hold the flange plates 9 of the masses 3 retained in the chambers 6b of the bore 6 by the holder portions 4d, while being connected through the guide pins 13 penetrating through the guide holes 14. In the torsional vibration damper 1 thus assembled, if the rotary disc 2 is rotated slowly and hence a centrifugal force applied to the masses 3 is weak, the masses 3 are gravitationally dropped in the chambers 6b. In this situation, the retainers 4 are subjected to a torque to rotate the rotary disc 2 clockwise applied from the mass 3 situated in the right side through the stopper 4b, and a torque to rotate the rotary disc 2 counterclockwise applied from the mass 3 situated in the left side through the stopper 4b. However, those torques cancel each other so that the retainers 4 are prevented from being rotated unintentionally. In addition, the masses 3 are prevented from colliding with the outer ends 6e of the chambers 6b.

Figure 5:
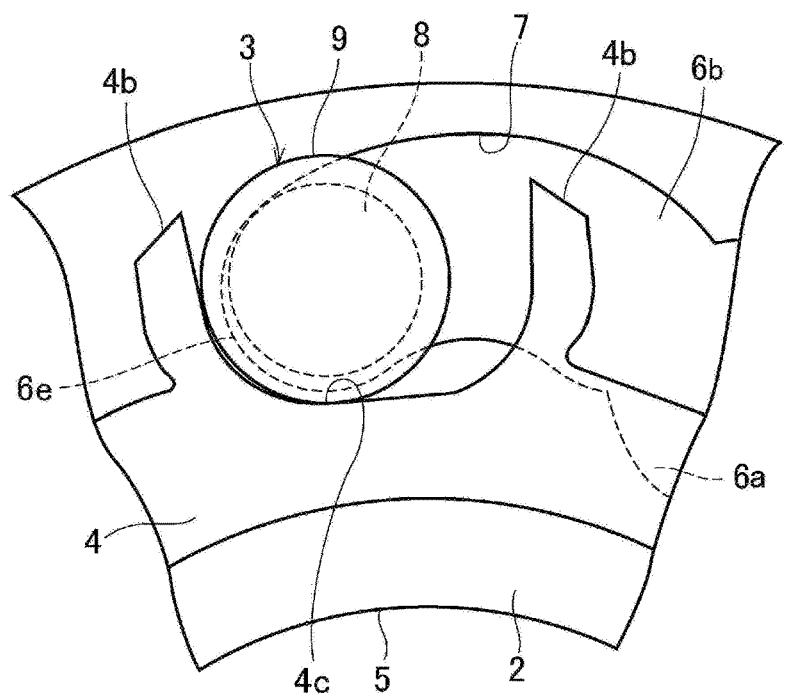
FIG. 5 is a partial expanded view showing the rolling mass stopped by the retainer and the raceway surface.

Given that the rotary disc 2 is connected to an engine, the rotary disc 2 may be rotated abruptly. In this situation, the masses 3 inertially remain in the current positions and consequently migrated in the counter direction relatively to the chambers 6b as depicted in FIG. 5. Although only one of the masses 3 is illustrated in FIG. 5, the remaining masses 3 are also brought into contact to the outer ends 6e of the chambers 6b. As described, a curvature radius of the raceway surface 7 of the chamber 6b is shorter than that of the rotary disc 2, and also shorter than that of the ring portion 4a of the retainer 4. In the chamber 6b, therefore, the mass 3 is displaced radially inwardly when the mass 3 comes close to the outer end 6e of the chamber 6b. On the other hand, a turning radius of the bottom 4c of the holder portion 4d of the retainer 4 is constant. That is, a curvature radius of the bottom 4c is larger than that of the raceway surface 7, and a radial position of the bottom 4c will not be changed even if the retainer 4 is rotated. When the mass 3 comes close to the outer end 6e of the chamber 6b, therefore, the flange plate 9 of the mass 3 is brought into contact to the bottom 4c of the holder portion 4d so that the trunk 8 of the mass 3 is pushed radially outwardly onto the raceway surface 7 of the chamber 6b. In other words, the mass 3 is clamped by the bottom 4c of the retainer 4 and the raceway surface 7 of the rotary disc 2. For this reason, further approach of the mass 3 toward the outer end 6e of the chamber 6b can be prevented. That is, collision noise and impact resulting from collision of the mass 3 against the outer end 6e of the chamber 6b can be reduced even when the rotary disc 2 is rotated abruptly.

Since the chambers 6b are symmetrical to each other across the insertion hole 6a and the holder portions 4d situated within those chambers 6b are also symmetrical to each other, the mass 3 held in the other chamber 6b of the bore 6 is also prevented from colliding with the outer end 6e of the other chamber 6b. In addition, when the mass 3 comes close to the virtual inner ends 6f of the chambers 6b, the mass 3 is also clamped by the bottom 4c of the retainer 4 and the raceway surface 7 of the rotary disc 2 thereby preventing an intrusion of the mass 3 into the insertion hole 6a. For this reason, undesirable disengagement of the mass 3 from the rotary disc 2 through the insertion hole 6a can be prevented. Thus, the bottom 4c of the holder portion 4d serves as the restricting portion.

When the rotary disc 2 is rotated at a speed higher than a predetermined speed, the mass 3 is centrifugally pushed onto the raceway surface 7 of the chamber 6b at a circumferentially intermediate point that is portion farthest from the center point O of the rotary disc 2. In this situation, the mass 3 is oscillated within the chamber 6b by an inertial torque resulting from pulsation of torque applied the rotary disc 2, and torsional vibrations of the rotary shaft resulting from the torque pulse is suppressed by such oscillating motion of the mass 3. According to the first embodiment of the present disclosure, since the rotary disc 2 is a singular member, the torsional vibration damper 1 may be assembled easily at a low cost. In addition, the torsional vibration damper 1 may be assembled accurately to ensure vibration damping performance.

Figure 6:
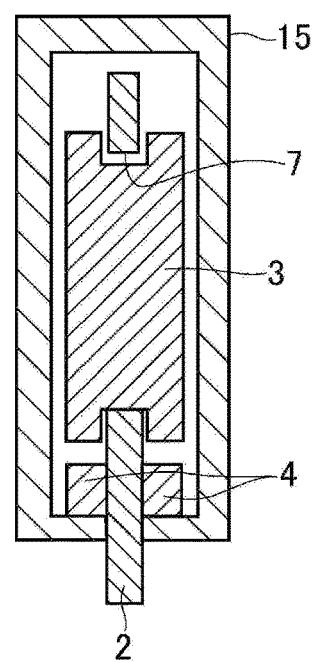
FIG. 6 is a partial cross-sectional view showing an example of covering an outer circumference of the rotary disc.

In order to effectively suppress the torsional vibrations on the rotary shaft resulting from pulsation of torque applied to the rotary disc 2, it is preferable to allow the mass 3 to oscillate smoothly. To this end, if the torsional vibration damper 1 is used e.g., in a fluid coupling, an outer circumferential portion of the rotary disc 2 may be covered liquid-tightly by a cover (or housing) 15 as depicted in FIG. 6, so as to protect the chambers 6b, the masses 3 and the retainers 4 from fluid flowing in the fluid coupling. In this case, since the retainers 4 may be supported by the cover 15, the guide pins 13 and the guide holes 14 may be omitted.

Figure 7:
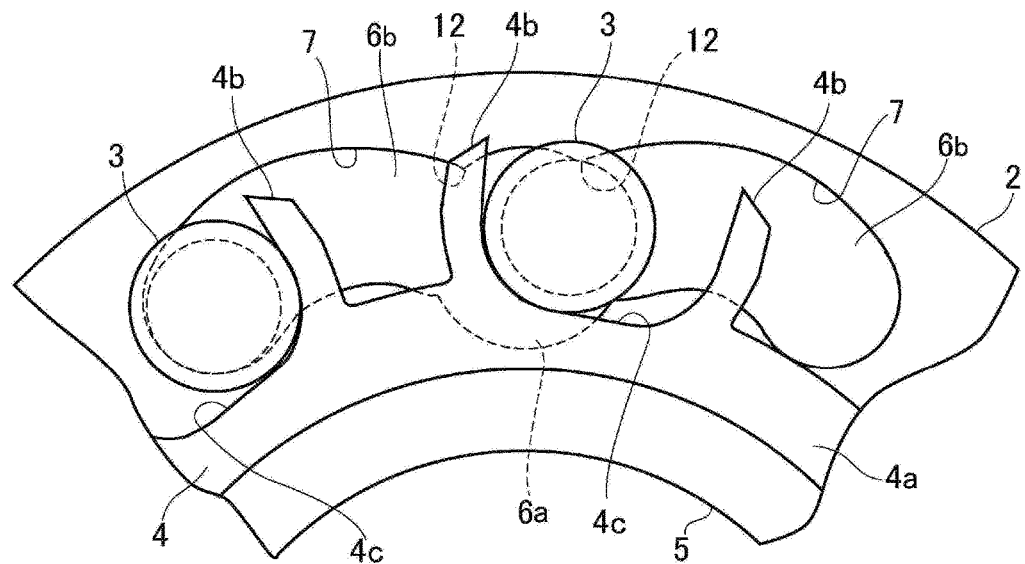
FIG. 7 is a partial expanded view showing an example of stopping the mass by the stopper portion.

Turning to FIG. 7, there is shown another embodiment of the present disclosure in which the stopper portions 4b of the retainer 4 individually serve as the restricting portion instead of the bottom 4c. According to another embodiment, the mass 3 is allowed to move to the outer end 6e of the chamber 6b, and further rotation of the retainer 4 toward the outer end 6e of the chamber 6b is stopped by the mass 3 situated at the outer end 6e of the chamber 6b. In this situation, further movement of the other mass 3 held in the other chamber 6b toward the insertion hole 6a is stopped by one of the stopper portions 4b of the adjacent holder portion 4d. Specifically, when one of the masses 3 in the bore 6 is situated at the outer end 6e of one of the chambers 6b, the other mass 3 held in the other chamber 6b is situated at the boundary 12 between the insertion hole 6a and the other chamber 6b. On the other hand, in the retainer 4, one of the stopper portions 4b of the holder portion 4d opposed to said one of the chambers 6b comes into contact to said one of the masses 3, and the adjacent stopper portion 4b of the adjacent holder portion 4d is situated at the boundary 12 between the insertion hole 6a and said one of the chambers 6b. In this situation, therefore, further rotation of the retainer 4 toward the outer end 6e of said one of the chambers 6b is stopped by said one of the masses 3, and further movement of the other mass 3 held in the other chamber 6b toward the insertion hole 6a is stopped by the stopper portion 4b situated at the boundary 12 between the insertion hole 6a and said one of the chambers 6b. Thus, according to another embodiment, an intrusion of the mass 3 into the insertion hole 6a is prevented by the stopper portion 4b closing the insertion hole 6a. In addition, the mass 3 may also be fitted into the chamber 6b from the insertion hole 6a, and disengagement of the mass 3 from the rotary disc 2 through the insertion hole 6a can be prevented.

Figure 8:
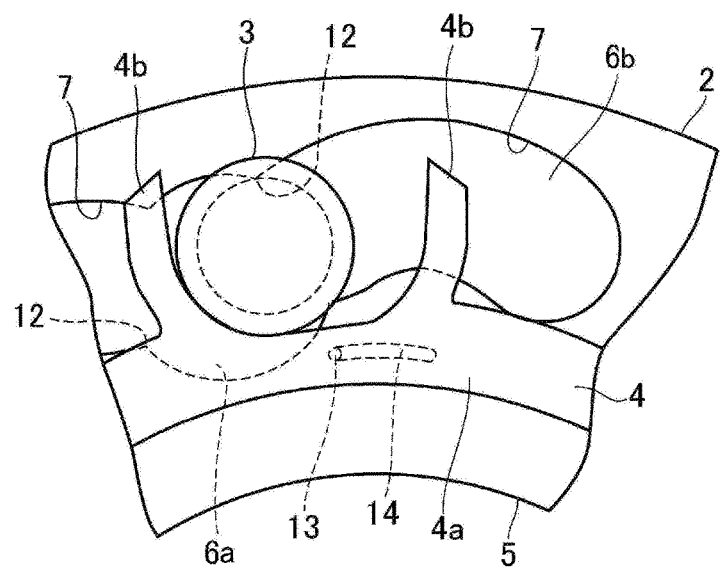
FIG. 8 is a partial expanded view showing the guide pin and the guide hole.

As shown in FIG. 8, such undesirable disengagement of the mass 3 from the rotary disc 2 through the insertion hole 6a may also be prevented by restricting the rotational range of the retainer 4 by the guide holes 14. In this case, a length of each of the guide holes 14 is set in such a manner that one of the stopper portions 4b of the holder portion 4d opposed to one of the chambers 6b is stopped at the boundary 12 between the insertion hole 6a and the other chamber 6b when the guide pin 13 comes into contact to one end of the guide hole 14. In the example shown in FIG. 8, therefore, further movement of the other mass 3 held in the chamber 6b toward the insertion hole 6a is stopped by the stopper portion 4b stopped at the boundary 12 between the insertion hole 6a and the other chamber 6b.

In the example shown in FIG. 8, it is preferable to stop the mass 3 held in the other chamber 6b in front of the outer end 6e of the other chamber 6b by the stopper portion 4b to reduce collision noise and impact.

Figure 9:
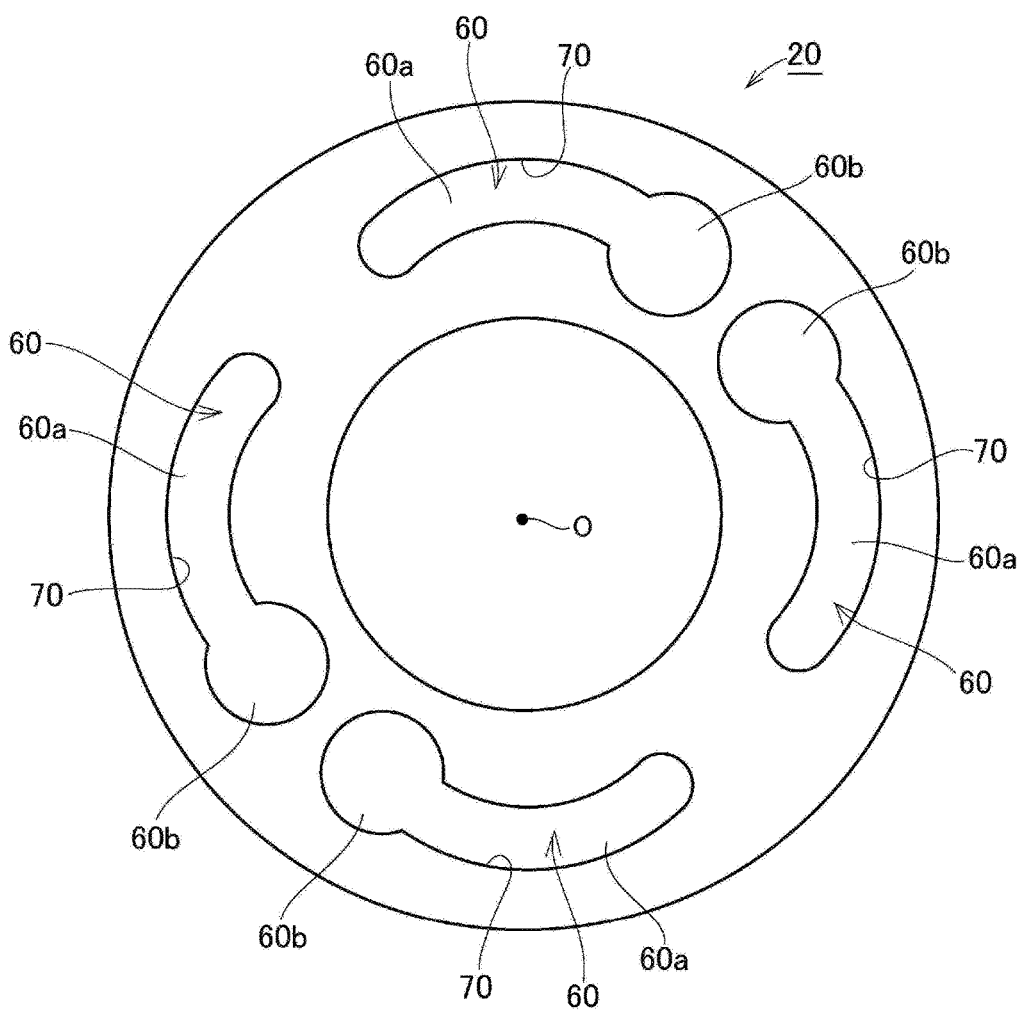
FIG. 9 is a front view showing a modification example of the bore.

Turning to FIG. 9, there is shown a modification example of the bore formed in the rotary disc. According to the example shown in FIG. 9, two pairs of bores 60 are formed in a rotary disc 20 at regular intervals in the circumferential direction. Each of the bores 60 comprises a curved oval chamber 60a and a circular insertion hole 60b joined to one end of the chamber 60a. A radially outer side of an inner circumferential face of the chamber 60a also serves as a raceway surface 70 for guiding the rolling mass. Specifically, in one of the pairs of the bores 60 adjacent to each other, the insertion holes 60b are joined to opposed ends of the chambers 60a. Likewise, in the other pair of the bores 60 adjacent to each other, the insertion holes 60b are also joined to the opposed ends of the chambers 60a. That is, the insertion holes 60b of said one of the pairs of the bores 60 and the insertion holes 60b of the other pair of the bores 60 are opposed to each other across the center point O of the rotary disc 20. Although not especially shown in FIG. 9, the foregoing mass 3 may be used in the example shown in FIG. 9, and hence each of the insertion holes 60b may be formed into same shape as the foregoing insertion hole 6a.

In the rotary disc 20, the mass may also be fitted into the chamber 60a from the insertion hole 60b by the same procedure as the foregoing embodiments. In a case of using the rotary disc 20 shown in FIG. 9, a pair of ring-shaped retainers having foregoing functions may also be arranged on both faces of the rotary disc 20. In this case, each of the retainers may be modified to have four holders for retaining the masses held in the chambers 60a, and connected to each other through the pins to rotate integrally. When the rotary disc 20 is rotated slowly, torques of the masses 3 gravitationally dropping in the chambers 60a of the right side and the chambers 60a of the left side cancel each other so that the retainers are prevented from being rotated unintentionally. By contrast, when the rotary disc 20 is rotated abruptly, the mass 3 is also clamped by the bottom of the retainer and the raceway surface 70 of the rotary disc 20 in the vicinity of the outer end of the chamber 60a and the insertion hole 60b. For this reason, collision noise resulting from collision of the mass against the outer end of the chamber 60a may also be reduced even when the rotary disc 20 is rotated abruptly. In addition, undesirable disengagement of the mass 3 from the rotary disc 20 through the insertion hole 60b may also be prevented. Further, as the foregoing embodiments, the torsional vibration damper 1 may be assembled easily at a low cost in the case of using the rotary disc 20.

Figure 10:
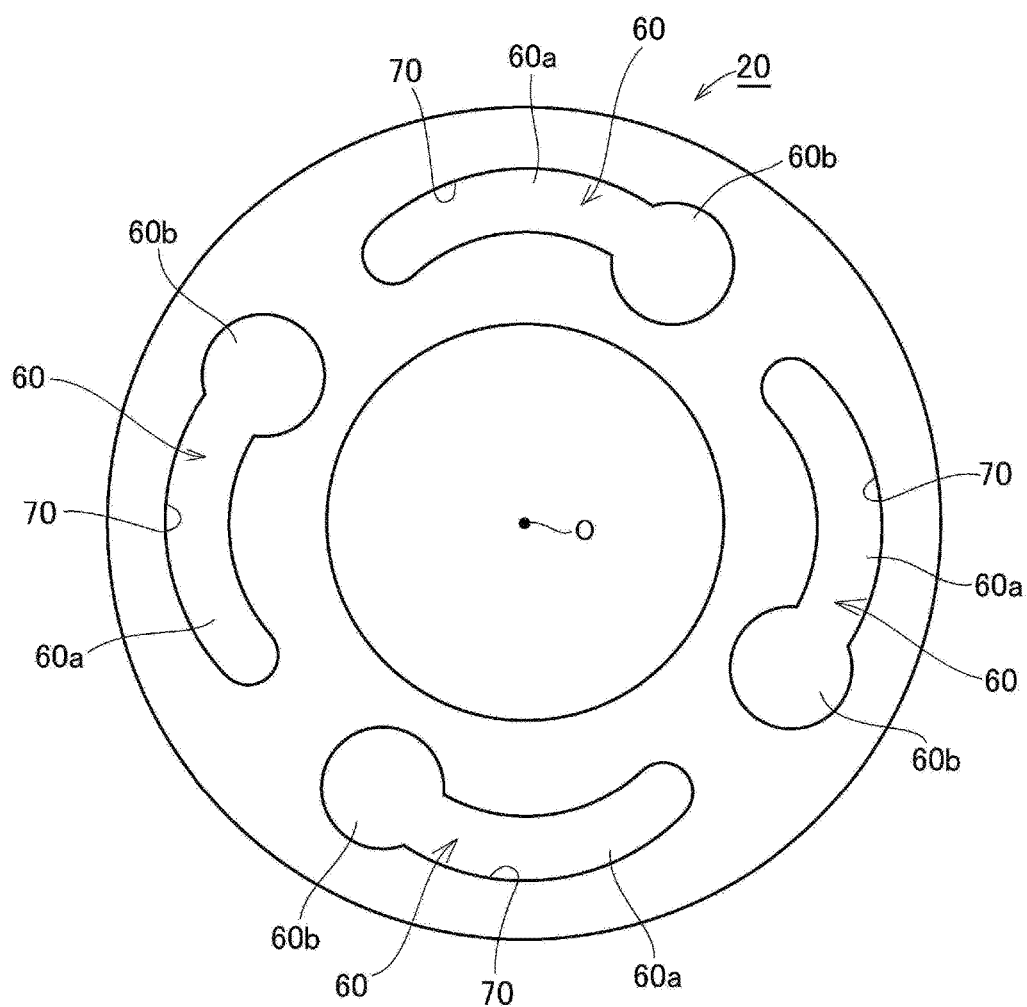
FIG. 10 is a front view showing another modification example of the bore.

As illustrated in FIG. 10, each of the insertion holes 60b may also be joined to the outer end of the bores 60 in the same side, (e.g., the right side in FIG. 10). In this case, the advantages of the modification example shown in FIG. 9 may also be achieved.

Figure 11:
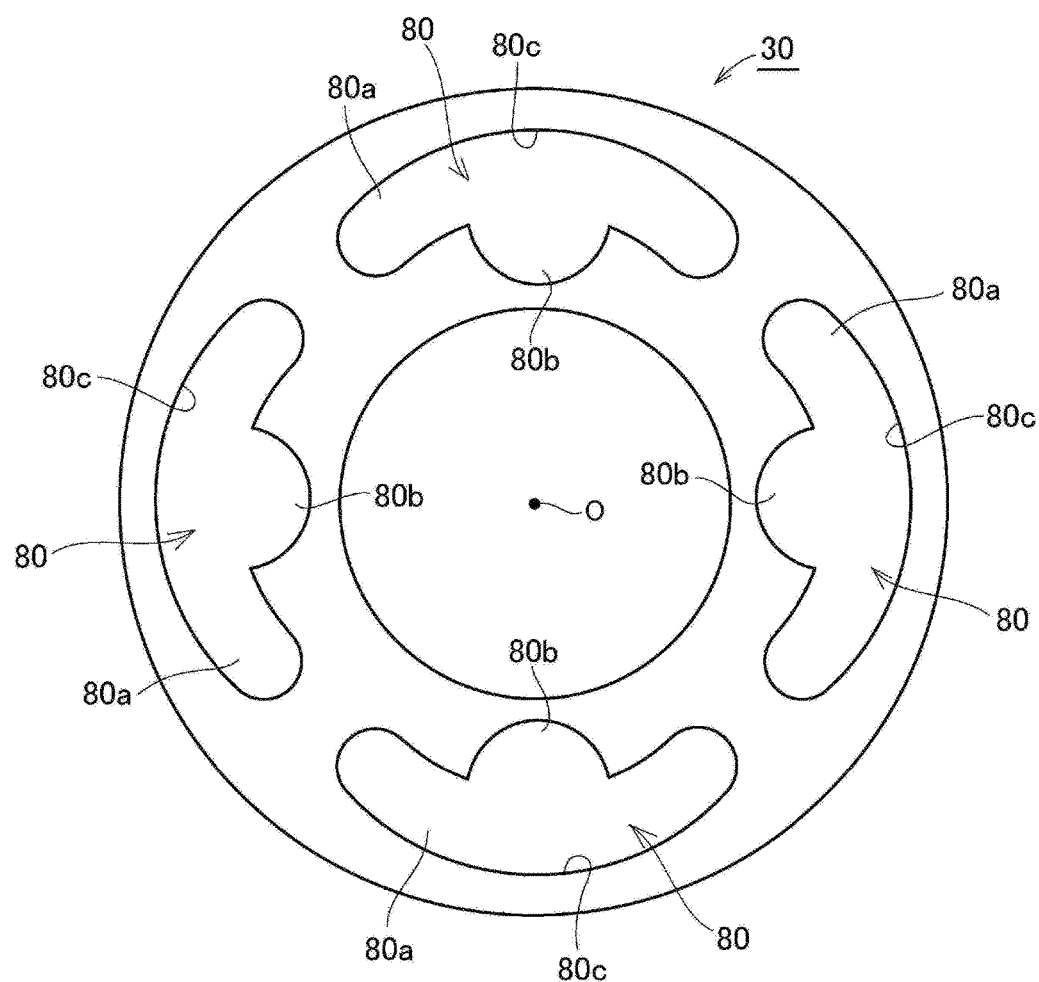
FIG. 11 is a front view showing still another modification example of the bore.
Figure 12:
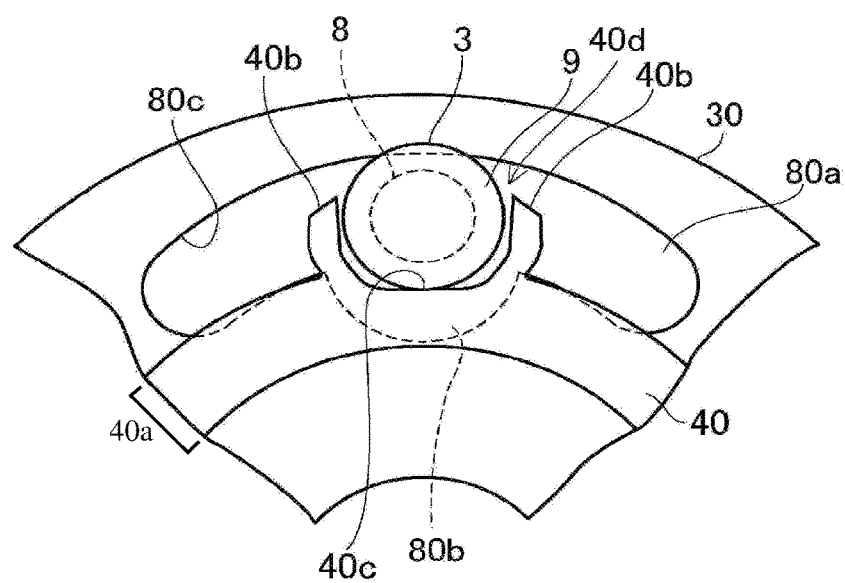
FIG. 12 is a partial expanded view showing the retainer used in combination with the rotary disc shown in FIG. 11.

Turning to FIGS. 11 and 12, there is shown another modification example of the bore formed in the rotary disc. In a rotary disc 30 shown in FIG. 11, bores 80 are formed at regular intervals in the circumferential direction. Each of the bores 80, comprises a curved oval chamber 80a and a semicircular insertion hole 80b protruding radially inwardly from an intermediate portion of the chamber 80a. A radially outer side of an inner circumferential face of the chamber 80a also serves as a raceway surface 80c for guiding the rolling mass.

FIG. 12 shows a retainer 40 used in combination with the rotary disc 30 shown in FIG. 11. The retainer 40 also comprises a ring portion 40a and a plurality of holder portions 40d. Each of the holder portions 40d comprises a pair of stopper portions 40b individually protruding radially outwardly from the ring portion 40a toward the raceway surface 80c. In the holder portion 40d, a bottom 40c is situated at a substantially same level as the outer circumference of the ring portion 40a to close an opening of the insertion hole 80b so that the flange plate 9 of the mass 3 held in the holder portion 40d is prevented from entering into the insertion hole 80b by the bottom 40c. Thus, in another modification example, the bottom 40c serves as the restricting portion.

According to another modification example shown in FIGS. 11 and 12, the advantages of the forgoing embodiments may also be achieved.

Although the above exemplary embodiment of the present application has been described, it will be understood by those skilled in the art that the drive unit according to the present application should not be limited to the described exemplary embodiment, and various changes and modifications can be made within the spirit and scope of the present disclosure. For example, the retainer may be modified to hold the masses by the holder portions from radially outer side.

What is claimed is:
1. A torsional vibration damper comprising:
a rotary disc in which a plurality of chambers each individually having a predetermined length in a circumferential direction and that are formed circumferentially at predetermined intervals;
a plurality of masses held in each chamber of the plurality of chambers while being allowed to be oscillated by pulsation of torque applied to the rotary disc; and
a retainer that retains the masses in each chamber of the plurality of chambers while maintaining intervals between the masses, and that is allowed to be rotated relative to the rotary disc by an oscillating motion of each of the masses,
wherein each of the masses comprises a trunk and a pair of diametrically-larger flange plates formed on both sides of the trunk,
an outer diameter of the trunk is smaller than an opening width of each of the chambers of the plurality of chambers, and a diameter of each of the flange plates is larger than the opening width of at least one of the chambers of the plurality of chambers,
an insertion hole that allows at least one of the pair of flange plates of the masses there through is formed between each set of adjoining chambers of the plurality of chambers,
an opening width of each of the chambers of the plurality of chambers at a portion joined to the insertion hole is larger than the outer diameter of the trunk of each of the masses, and
the retainer comprises a restricting portion that restricts an oscillating range of each mass of the masses in each of the chambers of the plurality of chambers toward the insertion hole, and
an opening diameter of each of the insertion holes is larger than the outer diameter of at least one of the flange plates of the masses,
wherein the retainer comprises a ring portion that extends in a circular manner radially within an inner side of each of the chambers of the plurality of chambers, and a plurality of holder portions individually formed of a pair of stopper portions protruding radially outwardly from the ring portion to hold each of the masses,
each of the chambers of the plurality of chambers respectively includes a raceway surface formed on a radially outer side of an inner circumferential face to which each mass of the masses is pushed centrifugally,
wherein each raceway surface is curved inwardly so that a curvature radius of each raceway surface is shorter than that of a bottom between each pair of the stopper portions of each holder portion of the plurality of holder portions, and
the bottom serves as the restricting portion that restricts the oscillating range of each mass of the masses in each chamber of the plurality of chambers, each mass of the masses is clamped by the bottom and each raceway surface of the rotary disc so as to prevent further approach of each mass of the masses toward an outer end of each chamber of the plurality of chambers.

2. The torsional vibration damper as claimed in claim 1, wherein a pair of each of the chambers of the plurality of chambers are joined to each other through the insertion hole.

3. The torsional vibration damper as claimed in claim 2, wherein a clearance between outer ends of the adjoining chambers of the plurality of chambers is wider than a clearance between the chambers of the plurality of chambers joined to each other through the insertion hole.

4. A torsional vibration damper comprising:
a rotary disc in which a plurality of chambers each individually having a predetermined length in a circumferential direction and that are formed circumferentially at predetermined intervals;
a plurality of masses held in each of the chambers of the plurality of chambers while being allowed to be oscillated by pulsation of torque applied to the rotary disc; and
at least one retainer that retains the masses in each of the chambers of the plurality of chambers while maintaining intervals between the masses, and that is allowed to be rotated relative to the rotary disc by an oscillating motion of each of the masses,
wherein each of the masses comprise a trunk and a pair of diametrically-larger flange plates formed on both sides of the trunk,
an outer diameter of the trunk is smaller than an opening width of each of the chambers of the plurality of chambers, and a diameter of each of the flange plates is larger than the opening width of at least one of each of the chambers of the plurality of chambers,
an insertion hole that allows at least one of the pair of flange plates of the masses there through is formed between adjoining chambers of the plurality of chambers,
an opening width of each of the chambers of the plurality of chambers at a portion joined to the insertion hole is larger than the outer diameter of the trunk of each of the masses, and
the at least one retainer comprises a restricting portion that restricts an oscillating range of each mass of the masses in each of the chambers of the plurality of chambers toward the insertion hole, and
an opening diameter of each of the insertion holes is larger than the outer diameter of at least one of the flange plates of the masses,
wherein the at least one retainer comprises a ring portion that extends in a circular manner radially within an inner side of each of the chambers of the plurality of chambers, and a plurality of holder portions individually formed of a pair of stopper portions protruding radially outwardly from the ring portion to hold each of the masses, and
at least one of the stopper portions closes at least a portion of the insertion hole and serves as the restricting portion to stop a movement of each mass of the masses toward the insertion hole.

5. The torsional vibration damper as claimed in claim 4, wherein the at least one retainer is a pair of retainers arranged on both sides of the rotary disc, the torsional vibration damper further comprises a guide pin formed on at least one of the retainers of the pair of retainers and the rotary disc to extend in parallel with a rotational center axis of the rotary disc thereby connecting ring portions of the pair of retainers, and
a guide hole having an arcuate shape formed on the other one of the pair of retainers and the rotary disc to guide the guide pin in a rotational direction of the rotary disc,
wherein the guide pin and the guide hole are arranged in such a manner that any one stopper portion of the pair of stopper portions is stopped between the insertion hole and each chamber of the plurality of chambers when the guide pin comes into contact with one end of the guide hole.

6. A torsional vibration damper comprising:
a rotary disc in which a plurality of chambers each individually having a predetermined length in a circumferential direction and that are formed circumferentially at predetermined intervals;
a plurality of masses held in each chamber of the plurality of chambers while being allowed to be oscillated by pulsation of torque applied to the rotary disc; and
a retainer that retains the masses in each chamber of the plurality of chambers while maintaining intervals between the masses, and that is allowed to be rotated relative to the rotary disc by an oscillating motion of each of the masses,
wherein each of the masses comprise a trunk and a pair of diametrically-larger flange plates formed on both sides of the trunk,
an outer diameter of the trunk is smaller than an opening width of each chamber of the plurality of chambers, and a diameter of each of the flange plates is larger than the opening width of at least one of the chambers of the plurality of chambers,
an insertion hole that allows at least one of the pair of flange plates of the masses there through is formed between adjoining chambers of the plurality of chambers,
an opening width of each chamber of the plurality of chambers at a portion joined to the insertion hole is larger than the outer diameter of the trunk of each of the masses, and
the retainer comprises a restricting portion that restricts an oscillating range of each mass of the masses in each chamber of the plurality of chambers toward the insertion hole, and
an opening diameter of each of the insertion holes is larger than the outer diameter of at least one of the flange plates of the masses,
wherein the insertion hole is formed in such a manner as to protrude radially inwardly from an intermediate portion of each chamber of the plurality of chambers,
the retainer comprises a ring portion that extends in a circular manner radially within an inner side of each chamber of the plurality of chambers, a plurality of holder portions individually formed of a pair of stopper portions protruding radially outwardly from the ring portion to hold each of the masses, and a bottom formed between the stopper portions, and
the bottom, situated at a substantially same level as a circumference of the ring portion, serves as the restricting portion to close at least a portion of the insertion hole thereby preventing each mass of the masses from entering into the insertion hole.

\* \* \* \* \*